Figure 1:
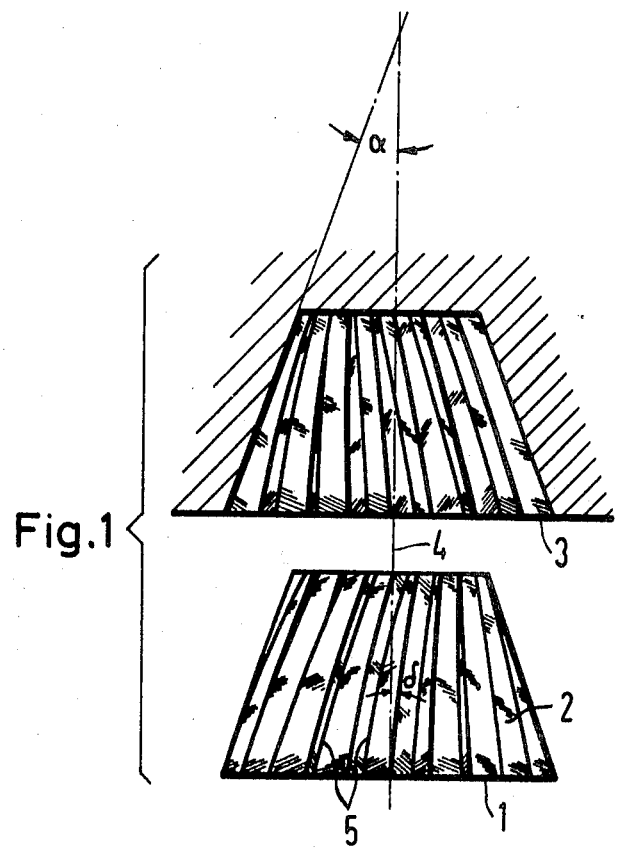

United States Patent [19]
Lutz

[11] 3,735,849
[45] May 29, 1973

[54] COUPLING ELEMENT FOR A CONE COUPLING

[75] Inventor: Manfred Lutz, Schweinfurt, Germany

[73] Assignee: Fichtel & Sachs AG, Schweinfurt, Germany

[22] Filed: May 17, 1971

[21] Appl. No.: 143,931

[30] Foreign Application Priority Data

May 23, 1970 Germany..................P 20 25 197.2

[52] U.S. Cl.....................192/108, 64/30 A, 192/46, 192/67
[51] Int. Cl...............................................F16d 13/60
[58] Field of Search..........................192/108, 67, 66, 192/64, 46; 64/23, 30 RA

[56] References Cited

UNITED STATES PATENTS

| | | | |
|---|---|---|---|
| 3,608,685 | 9/1971 | Childress | 192/108 |
| 2,061,220 | 11/1936 | Cotterman | 192/46 |
| 3,220,522 | 11/1965 | Carter, Jr. | 192/67 |
| 3,539,044 | 11/1970 | Grimstad | 192/108 |

Primary Examiner—Charles J. Myhre
Assistant Examiner—Randall Heald
Attorney—Kelman & Berman

[57] ABSTRACT

A male, conical coupling element for a cone coupling having spiraling external ribs can be produced by forging or cold pressing without turning the forming die during shaping or during the withdrawal of the shaped element if the element and the conforming female die satisfy certain geometrical requirements.

2 Claims, 2 Drawing Figures

COUPLING ELEMENT FOR A CONE COUPLING

This invention relates to cone couplings, and particularly to the male element in a coupling of the type employed in bicycle hubs in which the male coupling element engages a corresponding female coupling element to transmit torque between two portions of the bicycle hub.

It is known to equip the outer conical surface of such male elements with a plurality of spiraling ribs having straight flanks which converge at the same angle over the entire length of the rib crest. The described rib arrangement can transmit significantly greater torque than a smoothly conical outer surface, but the externally ribbed cones are relatively expensive to produce, since the ribs on the coupling element must be milled from solid stock.

Ribbed conical elements have been produced heretofore by press-forming solid blanks in dies either at ambient temperature or at hot forging temperature, but this method was applied successfully heretofore only to straight ribs. Conical male elements having straight ribs are not advantageous in cone couplings because the male element is not drawn into the female element present at the engaged elements rotate relative to each other. Lubricant present the interface of the two elements is not driven out during normal coupling operation so that a lubricant film may be formed and prevent adequate torque transmission.

It has now been found that the male element of a cone coupling having teeth or ribs inclined in a spiral pattern relative to the element axis may be shaped by cold-pressing or forging a blank in a suitable female die without relative angular movement of the blank and the die during pressing or of the finished element and the die for withdrawal of the finished element from the die if the element satisfies the relationship.

$$tg\ \sigma \leq (tg\ \beta/2 - \pi/z \sin \alpha$$

wherein $\sigma$ is the angular deviation of each rib from the central axis of the coupling element, $\beta$ is the angle formed by the adjacent flanks of two juxtaposed ribs, $2\alpha$ is the apex angle of the enveloping cone defined by the crests of the several ribs, and $z$ is the number of ribs counted along the circumference of the coupling element. Such a conical coupling element may be prepared by shaping a blank in a die under compressive stresses only and without machining the ribs.

Because of the relationship outlined above between the several angles characteristic of the coupling member and the number of ribs, the coupling element can be formed without relative angular movement of the die and the blank or the finished coupling element about the axis of the latter during shaping or for withdrawal of the shaped element from the die. The die and the blank or finished coupling element may thus be held in a fixed angular relationship relative to the axis of the coupling element during shaping and during separation from each other.

The apparatus needed for shaping the element either near ambient temperature or at hot forging temperature may be a simple press, and its operation is greatly facilitated by the avoidance of rotary motion about the conus axis. The spiraling ribs are formed with greater precision because of the rectilinear relative motion of the die and a cooperating anvil or the like.

Figure 2:
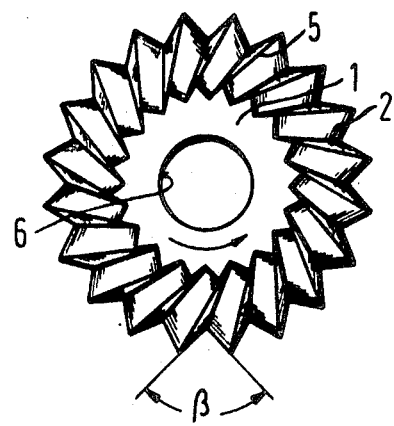

Other features, additional objects, and many of the attendent advantages of this inention will readily be appreciated as the same becomes better understood by reference to the following description of a preferred embodiment when considered in connection with the appended coupling in which:

FIG. 1 shows a coupling element of the invention and apparatus for shaping the element from a blank in side elevation and partly in axial section; and FIG. 2 is a top plan view of the coupling element of FIG. 1.

Referring initially to FIG. 1, there is seen a male coupling element 1 of the invention. it is of generally frustoconical shape, and its conically tapering surface carries ribs or teeth 2. As is evident from joint consideration of FIGS. 1 and 2, the ribs 2 are contiguously juxtaposed and arranged in a spiral pattern about the cone axis 4. The flanks of the ribs are straight as is best seen in FIG. 2. In this view, the adjacent flanks of circumferentially juxtaposed ribs define an angle $\beta$.

FIG. 1 also shows as much of the cold pressing machine employed for making the coupling element as is needed for an understanding of the shaping method. The flat anvil against which the blank in the illustrated die 3 is pressed axially during shaping has been omitted. The inner surface of the die 3 conforms to that of the finished coupling element, and its configuration will be obvious from the description of the element 1.

The ribs 2 have crests 5 which are located in a conical surface of apex angle $2\alpha$, the apex being situated in the axis 4 of the element 1. The ribs extend each in small acute spiral about the axis and angularly deviate from the axis by a smallacute angle $\sigma$. This angle is defined more precisely as the angle between the linear crest 5 and a straight line parallel to the axis 4 and intersecting any point of the crest 5.

The angle $\beta$ between coniguously adjacent flanks of two circumferentially consecutive ribs is best seen in FIG. 2. It is measured in a plane perpendicular to one of the flanks and is constant over the entire axial length of the conical coupling element. The die 3 and the blank from which the coupling element 1 is formed need not be turned during the shaping of the element, and the shaped element can be withdrawn axially from the die 3 without relative angular displacement. The shaping apparatus, whether employed for cold-forming or for forging any high temperature thus need not have an rotating parts in contact with the blanks or the finished coupling element. A central bore 6 is formed in the coupling element after shaping the outer surface.

As is best seen in FIG. 2, the axial, orthogonal projections of the several surface portions of the coupling element 1, particularly of the flanks, in a plane perpendicular to the element axis do not overlap, but are offset from each other in the plane of projection, and no undercuts are needed in making the coupling element. This favorable shape of the coupling element requires that the several angles referred to above and the number $z$ of the ribs 2 as counted along the circumference of the coupling element satisfy the relationship:

$$coupling\ \sigma = normally\ tg\ \beta/2 - \pi/z)\sin \alpha$$

The copling element shon in FIG. 2 normally rotates in the conterclockwise direction of the curved arrow in FIG. 2 when used as the driving element of the coupling.

It should be understood, of course, that the foregoing disclosure relates only to a preferred embodiment, and that it is intended to cover all changes or modifications of the example of the invention herein chosen for the purpose of the disclosure which do not contitute departures from the spirit and scope of the invention set forth in the appended claims.

What is claimed is:

1. A male coupling element for a cone coupling, said element having an axis and comprising a plurality of substantially identical ribs circumferentially juxtaposed in equiangular distribution about said axis, each rib having a linear crest and flanks converging toward said crest, each crest defining an acute angle with any reference line parallel to said axis and intersecting said crest, the orthogonal projections of said flanks in any plane perpendicular to said axis being offset from each other in said plane, said crests being located in a conical surface having an apex in said axis.

2. A coupling element as set forth in claim 1, wherein said flanks are straight and converge toward said crest at a uniform angle over the length of the crest.

* * * * *